United States Patent [19]

Kojyo et al.

[11] Patent Number: 5,075,870
[45] Date of Patent: Dec. 24, 1991

[54] METHOD AND DEVICE FOR DETERMINING WHETHER OR NOT ORIGIN RETURN OPERATION FOR INDUSTRIAL ROBOT IS REQUIRED

[75] Inventors: Kazunobu Kojyo; Yasuhide Nagahama, both of Fujisawa; Manabu Nagata, Kamakura; Toshinao Takayama, Yokohama, all of Japan

[73] Assignee: Kabushiki Kaisha Kobe Seiko Sho, Kobe, Japan

[21] Appl. No.: 544,623

[22] Filed: Jun. 27, 1990

[51] Int. Cl.⁵ .............................................. G05B 15/00
[52] U.S. Cl. ...................................................... 395/89
[58] Field of Search .................... 364/513; 318/568.22

[56]         References Cited
        U.S. PATENT DOCUMENTS

| 4,575,666 | 3/1986 | Nakashima et al. | 318/568.22 |
| 4,757,458 | 7/1988 | Takemoto et al. | 364/513 |
| 4,980,839 | 12/1990 | Souji et al. | 364/513 |

FOREIGN PATENT DOCUMENTS 0158781 10/1985 European Pat. Off. .
0177901  4/1986 European Pat. Off. .

*Primary Examiner*—Allen R. MacDonald
*Attorney, Agent, or Firm*—Oblon, Spivak, McClelland, Maier & Neustadt

[57]         ABSTRACT

A method and device determines whether or not an origin return operation is required for an industrial robot, such as an arc welding robot, upon resupplying of power after power cut-off during operation of the robot. The method and device enlarge an applicable range of an origin return elimination technique and also improve the reliability of a rotational angle detecting device. After power cut-off during the operation of the industrial robot, a plurality of position data of the same movable portion of the robot are retrieved, and a determination is made as to whether or not the origin return operation is required upon resupplying of power according to a difference between each position data.

2 Claims, 11 Drawing Sheets

FIG. I

METHOD AND DEVICE FOR DETERMINING WHETHER OR NOT ORIGIN RETURN OPERATION FOR INDUSTRIAL ROBOT IS REQUIRED

BACKGROUND OF THE INVENTION

1. Field of the Invention

The present invention relates to a method and device for determining whether or not an origin return operation is required upon resupplying of power after power cut-off during operation of an industrial robot such as an arc welding robot.

2. Description of the Prior Art

Generally, in controlling an industrial robot such as an arc welding robot, it is necessary to detect a rotational angle of each rotating axis (movable portion) of arms or the like of the robot with a high accuracy. Further, it is desired that an absolute rotational angle of each rotating axis can be detected without carrying out an origin return operation upon resupplying of power after power cut-off.

There has been conventionally proposed a rotational angle detecting device as shown in FIG. 11. Referring to FIG. 11, the rotational angle detecting device includes an arm 1 of the industrial robot, a rotating axis 1a of the arm 1, a speed reducer 2, a motor 3 for rotationally driving the arm 1 via the speed reducer 2, a resolver 4 connected via the speed reducer 2 and the motor 3 to the rotating axis 1a of the arm 1 for detecting an absolute rotational angle ($\theta$) within a predetermined rotational angle (e.g., one revolution or 360°). Also provided are a driver 5 for exciting the resolver 4, a resolver/digital (R/D) converter 6 for converting a detection signal from the resolver 4 into a digital signal, and a resolver/pulse (R/P) converter 7 for pulsing the detection signal from the resolver 4 and for converting the same into incremental signals having A, B and Z phases. The pulse signal having the Z phase is used for setting an origin, and the pulse signals having the A and B phases are output with a phase difference of 90°, so that a rotational direction is detected by checking a priority relationship between these pulse signals.

Reference numeral 8 designates an updown counter for counting the pulse signals having the A and B phases from the R/P converter 7 to output an absolute rotational angle within one revolution of the motor 3 divided into 256 with 8 bits by using low-order bits $2^0$ to $2^7$, while counting carry and borrow signals of $2^7$ corresponding to one revolution of the motor 3 to output an absolute revolution number by using high-order bits $2^8$ to $2^{15}$. Reference numeral 9 designates a first memory for storing a count value from the low-order bits $2^0$ to $2^7$ of the updown counter 8 receiving the detection signal (the absolute rotational angle within one revolution) from the resolver 4 at the timing of power cut-off. Reference numeral 10 designates a second memory for storing a count value from the high-order bits $2^8$ to $2^{15}$ of the updown counter 8 at the timing of power cut-off. Reference numeral 11 designates a comparator for comparing an actual detection signal from the resolver 4 digitized by the R/D converter 6 upon resupplying of power with the detection signal stored into the first memory upon power cut-off. Reference numeral 12 designates a corrector for correcting the count value stored into the second memory 10 upon power cut-off to an actual count value corresponding to an actual absolute revolution number according to a result of a comparison from the comparator 11 (which will be hereinafter described in detail) and setting the corrected value into the high-order bits $2^8$ to $2^{15}$ of the updown counter 8.

The actual detection signal from the resolver 4 digitized by the R/D converter 6 upon resupplying of power is set into the low-order bits $2^0$ to $2^7$ of the updown counter 8. The first memory 9 and the second memory 10 are constructed of a non-volatile memory or a battery backup RAM.

In a normal detecting operation of a rotational angle, an origin return operation is first carried out, and a detection phase sin ($\omega t + \theta$) is output from the resolver 4 which has received an excitation phase (sin $\omega t$, cos $\omega t$) from the driver 5. From the detection phase, an absolute rotational angle $\theta$ within one revolution of the motor 3 is obtained, and the detection signal is pulsed by the R/P converter 7. Then, the pulse signals (A and B phases) are counted by the updown counter 8 to thereby output an absolute rotational angle within one revolution from the low-order bits $2^0$ to $2^7$ and also output an absolute revolution number of the motor 3 from the high-order bits $2^8$ to $2^{15}$. Thus, an absolute rotational angle of the motor 3 is detected as the sum of the absolute rotational angle within one revolution and (the absolute revolution number)×360°.

Under the above condition where the rotational angle is detected once after carrying out the origin return operation, when the power of the device is cut off, the detection signal from the resolver 4 at the timing of power cut-off is stored into the first memory 9 as the count value from the low-order bits $2^0$ to $2^7$ of the updown counter 8. Simultaneously the count value from the high-order bits $2^8$ to $2^{15}$ is stored into the second memory 10. At this time, while the count value in the updown counter 8 is reset by the power cut-off, the contents stored in the memories 9 and 10 do not volatilize.

Further, when the power is turned off, the motor 3 is braked by a braking device (not shown) to hinder excess rotation at an angle greater than ±180° even if an external force (e.g., gravity moment) is applied to the arm 1 until the power is turned on again. In this manner, if a difference in rotational angle of the motor 3 between upon power cut-off and upon resupplying of power is equal to or less than ±180°, the absolute rotational angle of the motor 3 can be corrected, as described below, thereby eliminating the need for an origin return operation.

That is, when the power is resupplied after power cut-off, a detection signal from the resolver 4 is digitized by the R/D converter 6, and it is newly set as an absolute rotational angle within one revolution upon resupplying of power into the low-order bits $2^0$ to $2^7$ of the updown counter 8. Simultaneously, the digital detection signal from the R/D converter 6 is input into the comparator 11. Then, the comparator 11 compares the actual detection signal from the resolver 4 with the detection signal upon power cut-off which signal is input from the first memory 9. The comparator 11 then outputs a correction command to the corrector 12 according to a difference between the actual detection signal from the resolver 4 and the detection signal from the first memory 9. If the result of the comparison in the comparator 11 [i.e., (the actual detection signal from the resolver 4)−(the detection signal from the first memory 9 upon power cut-off)] is in the range of −180° to +180°, the correction command is not output. If the result is in the range of −360° to −180°, the correction command is output to the corrector 12 so as to add 1 to the count value (the high-order bits $2^8$ to $2^{15}$) from the second memory 10 upon power cut-off. Similarly, if the result is in the range of 180° to 360°, the correction command is also output to the corrector 12 so as to subtract 1 from the count value.

Accordingly, even if the motor 3 is rotated, by an external force during the power off state, past a zero detection point of the resolver 4, a revolution number of the motor 3 can be prevented from being miscounted upon resupplying of power. That is, after the count value stored in the second memory 10 upon power cut-off is corrected to an actual count value corresponding to an actual absolute revolution number including the rotation during the power off state by the comparator 11 and the corrector 12, the corrected count value is set into the high-order bits $2^8$ to $2^{15}$ of the updown counter 8.

Thus, even if the motor 3 is rotated during the power off state, the absolute rotational angle of the motor 3 upon resupplying of power can be accurately detected as an output from the updown counter 8 which is the sum of the absolute rotational angle within one revolution from the resolver 4 and (the corrected actual count value)×360°. Further, as far as the rotational angle of the motor 3 during the power off state does not exceed ±180°, the origin return operation upon resupplying of power is not required.

In the case where the power is turned off under a stop condition of the industrial robot, the attitude of the industrial robot is normally sufficiently retained by a braking force of the brake of the motor 3. Therefore, the further rotation of the motor 3 during the power off state is small due to, for example, play of the brake, and does not exceed ±180°. Accordingly, the absolute rotational angle of the motor 3 is detected by the above conventional rotational angle detecting device without carrying out the origin return operation.

On the other hand, in the case where the power is turned off under the operating condition of the industrial robot such that the motor 3 is rotated at a speed less than a certain value, and a primary power supply is suddenly cut off (power failure), or an emergency stop button is operated, or an emergency stop condition due to abnormality (heavy abnormality) of a computer, servo, etc. is generated, the rotational angle of the motor 3 after power cut-off can be made within ±180°, and the information concerning the position data at this time can be stored into the memories 9 and 10. However, if the industrial robot is operated at a speed greater than the certain value upon power cut-off, it is difficult to stop the robot within a period of time until a CPU for controlling the robot is rendered inoperable because of the power cut-off.

In the above circumstances, it could be considered that when the power is turned off, such as by power failure during the operation of the robot, the origin return operation is necessarily carried out upon resupplying of power. However, the robot is actually often operated at a low speed to some extent and stopped upon power failure in a position range where the origin return operation is not required. Accordingly, if the origin return operation is carried out after solution of the power failure whenever the power failure occurs, an applicable proportion of the origin return operation elimination technique would be lowered, and the effect of the origin return operation elimination technique by the above-mentioned rotational angle detecting device could not be sufficiently obtained.

SUMMARY OF THE INVENTION

The present invention has been achieved to solve this problem, and it is an object of the present invention to provide a method and device for determining whether or not the origin return operation for the industrial robot is required upon resupplying of power after power cut-off during the operation of the industrial robot, thereby enlarging an applicable range of the origin return operation elimination technique.

According to a first embodiment of the present invention, there is provided a method of determining whether or not an origin return operation for an industrial robot is required, comprising the steps of (a) detecting at least two position data of the same movable portion of said industrial robot at a predetermined time interval after power cut-off during operation of said industrial robot; (b) comparing said at least two position data detected with each other and obtaining a difference therebetween; (c) comparing said difference with a permissible value corresponding to said difference in the case where said movable portion can be stopped at a limit position where the origin return operation is not required after storing of said position data; and (d) determining that the origin return operation is required upon resupplying of power if said difference is greater than said permissible value, while determining that the origin return operation is not required upon resupplying of power if said difference is equal to or less than said permissible value.

With this construction of the first embodiment, if the difference between the two position data (which difference is proportional to a speed of the movable portion) is greater than the permissible value, it is determined that the speed of the movable portion is high, so that the movable portion cannot be stopped in a position range where the origin return operation is not required, and that the origin return operation is required upon resupplying of power. On the other hand, if the difference is equal to or less than the permissible value, it is determined that the speed of the movable portion is low, so that the movable portion can be stopped in the position range where the origin return operation is not required, and that the origin return operation is not required after solution of the power failure.

According to a second embodiment of the present invention, there is provided a method of determining whether or not an origin return operation for an industrial robot is required, comprising the steps of (a) detecting a plurality of position data of the same movable portion of said industrial robot at fixed time intervals after power cut-off during operation of said industrial robot; (b) obtaining a difference between two of said position data detected at the fixed time interval sequentially until said difference becomes equal to or less than a predetermined permissible value; and (c) determining that the origin return operation is not required upon resupplying of power only when said difference is equal to or less than said predetermined permissible value.

With this construction of the second embodiment, the difference between two of the plural position data at the fixed time interval (which difference is proportional to a speed of the movable portion) is sequentially obtained until the difference becomes equal to or less than the predetermined permissible value. Then, only when the difference is equal to or less than the predetermined permissible value, it is determined that the speed of the movable portion is low, so that the movable portion can be stopped in a position range where the origin return operation is not required, and that the origin return operation is not required after solution of the power failure.

According to a third embodiment of the present invention, there is provided a device for determining whether or not an origin return operation for an industrial robot is required, comprising a motor for driving each axis of said industrial robot, absolute rotational angle detecting means for detecting an absolute rotational angle within one revolution of said motor, a control section for controlling said industrial robot in receipt of absolute rotational angle data from said absolute rotational angle detecting means through a generalized bus line, an origin return elimination interface section provided in said generalized bus line, non-volatile memory means provided in said origin return elimination interface section for storing the absolute rotational angle data for said absolute rotational angle detecting means upon power cut-off of said industrial robot, and determining means provided in said control section for determining whether or not the origin return operation of said industrial robot is required upon resupplying of power according to the data stored in said non-volatile memory means.

With this construction of the third embodiment, the absolute rotational angle data of each motor detected just before power cut-off is stored into the non-volatile memory means in the interface section provided in the generalized bus line at the timing of power cut-off. Then, upon resupplying of power, the absolute rotational angle data stored in the non-volatile memory means is read out through the generalized bus line to the control section. Then, the determination as to whether or not the origin return operation is required is carried out by the determining means in the control section according to the absolute rotational angle data read out from the non-volatile memory means.

DETAILED DESCRIPTION OF THE PREFERRED EMBODIMENTS

There will now be described the first and second preferred embodiments of the present invention with reference to the drawings.

Figure 11:
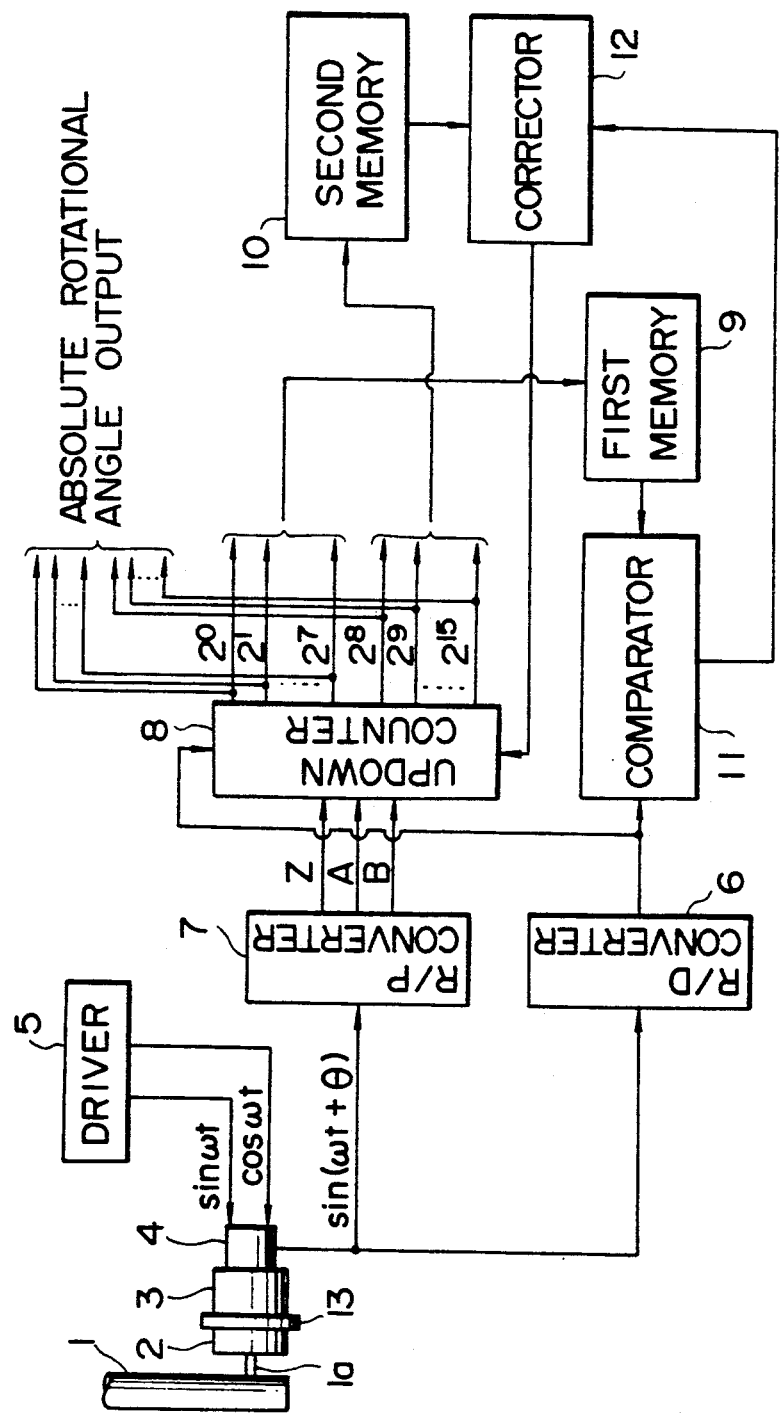
FIG. 11 is a block diagram of the rotational angle detecting device for the industrial robot in the prior art.

First, a device to which the method of the present invention is applied will be described with reference to FIGS. 1 and 2. The preferred embodiments are applied to the device similar to the rotational angle detecting device as shown in FIG. 11, and the same parts as those shown in FIG. 11 are designated by the same reference numerals. Accordingly, the explanation of the same parts will be omitted hereinafter.

Figure 1:
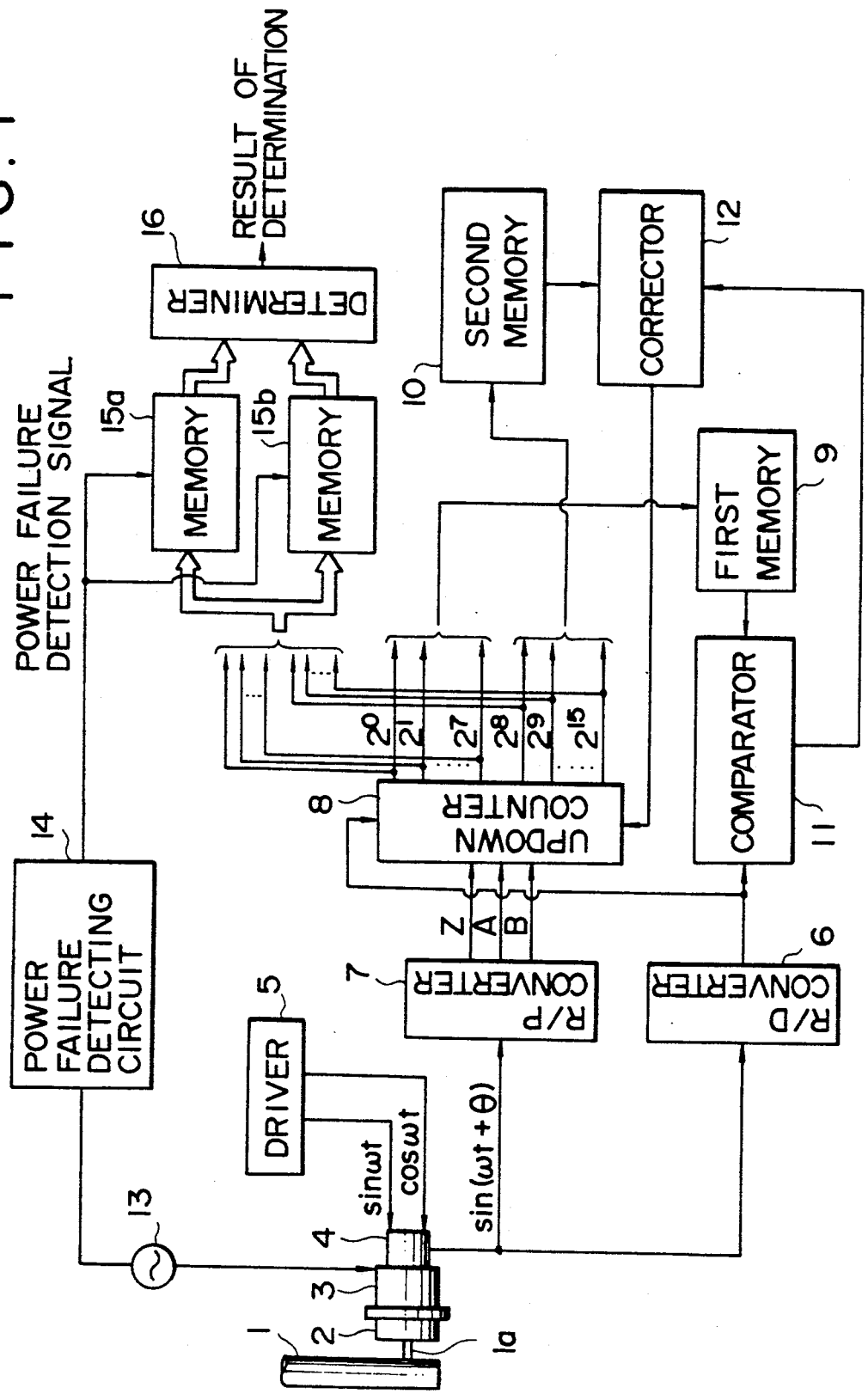
FIG. 1 is a block diagram of an exemplary device for embodying the method of determining whether or not the origin return operation for the industrial robot is required according to the present invention.

Referring to FIG. 1, reference numeral 13 designates an AC power supply for supplying an electric power to an industrial robot (e.g., motor 3), and reference numeral 14 designates a power failure detecting circuit (power failure detecting means) for detecting power failure of the power supply 13. The construction of the power failure detecting circuit 14 will be hereinafter described in detail with reference to FIG. 2. Reference numerals 15a and 15b designate non-volatile memories (position data storing means) for storing and retaining count values (rotational position data of the motor 3) from an updown counter (position data detecting means) 8. When receiving a power failure signal from the power failure detecting circuit 14, the memories 15a and 15b store two count values, respectively, which relate to a rotational angle of the motor 3 at a predetermined time interval, according to the method of the first preferred embodiment to be hereinafter described, or alternately store plural count values relating to a rotational angle of the motor 3 at fixed time intervals $\Delta t$ (e.g., every control period of 20 msec), according to the method of the second preferred embodiment to be hereinafter described. These count values correspond to position data of the same movable portion of the industrial robot.

Reference numeral 16 designates a determiner (determining means) for determining whether or not an origin return operation of the industrial robot is required after solution of the power failure, according to the data stored in the memories 15a and 15b (detection results of the updown counter 8). The determiner 16 operates in the following manner according to the methods of the first and second preferred embodiments to be hereinafter described.

In the case of applying the method of the first preferred embodiment, the determiner 16 compares two count values from the memories 15a and 15b with each other, calculates a difference therebetween, and compares the difference with a predetermined permissible value. If the difference is greater than the permissible value, the determiner 16 determines that the origin return operation after solution of the power failure is required, while if the difference is equal to or less than the permissible value, the determiner 16 determines that the origin return operation after solution of the power failure is not required. The permissible value is preliminarily set and obtained by measurement or calculation, that is, this value is a difference between two position data (count values) stored in the memories 15a and 15b when the motor 3 stops at a limit position where the origin return operation is not required. In other words, the permissible value is proportional to a rotational speed of the motor 3 where the motor 3 can stop at the limit position where the origin return operation is not required.

Figure 6:
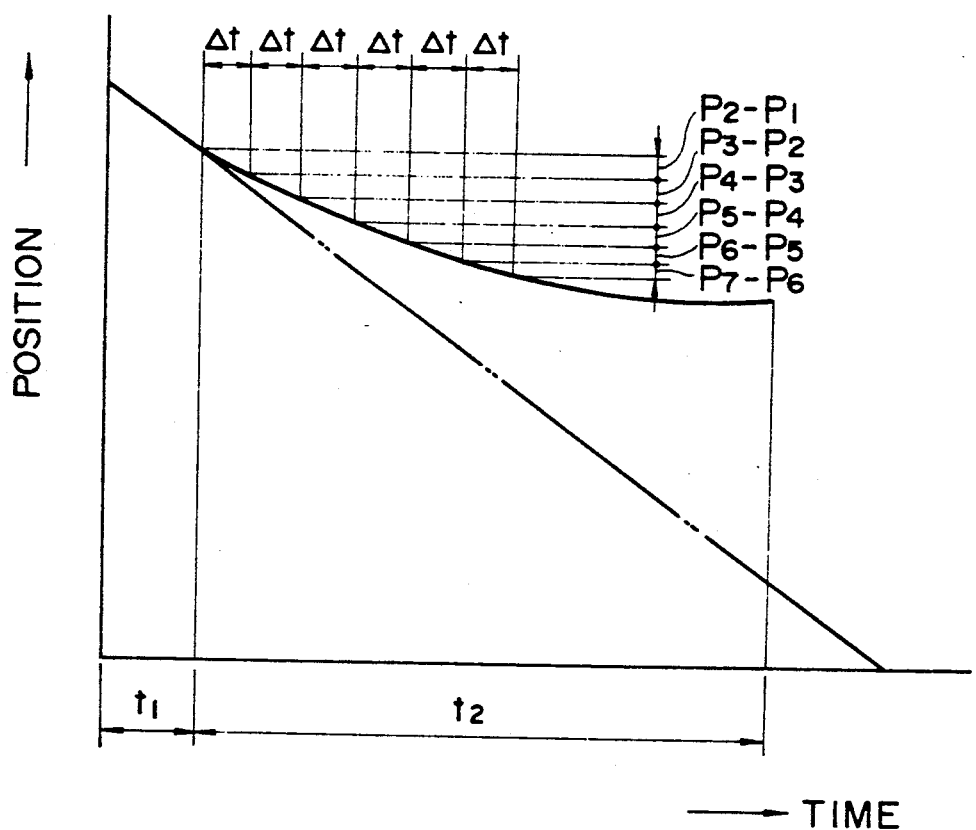
FIG. 6 is a graph illustrating the operation of the second preferred embodiment of the present invention.

In the case of applying the method of the second preferred embodiment, the determiner 16 compares count values from the memories 15a and 15b, sequentially calculates a difference ($P_n - P_{n-1}$) between two position data $P_n$ and $P_{n-1}$ at fixed time intervals $\Delta t$, as shown in FIG. 6 (where n represents integers of 1 to 7 in case of FIG. 6), and compares the difference with a predetermined permissible value $\Delta x_0$. If the difference becomes equal to or less than the predetermined permissible value $\Delta x_0$, the determiner 16 determines that the origin return operation after solution of the power failure is not required. In this case, the determiner 16 continues to sequentially calculate the difference $(P_n - P_{n-1})$ until the difference becomes equal to or less than the permissible value $\Delta x_0$. As similar to the first preferred embodiment, the permissible value $\Delta x_0$ is also preliminarily set and obtained by measurement or calculation, and this value is proportional to the rotational speed of the motor 3 where the motor 3 can stop at the limit position where the origin return operation is not required.

Figure 2:
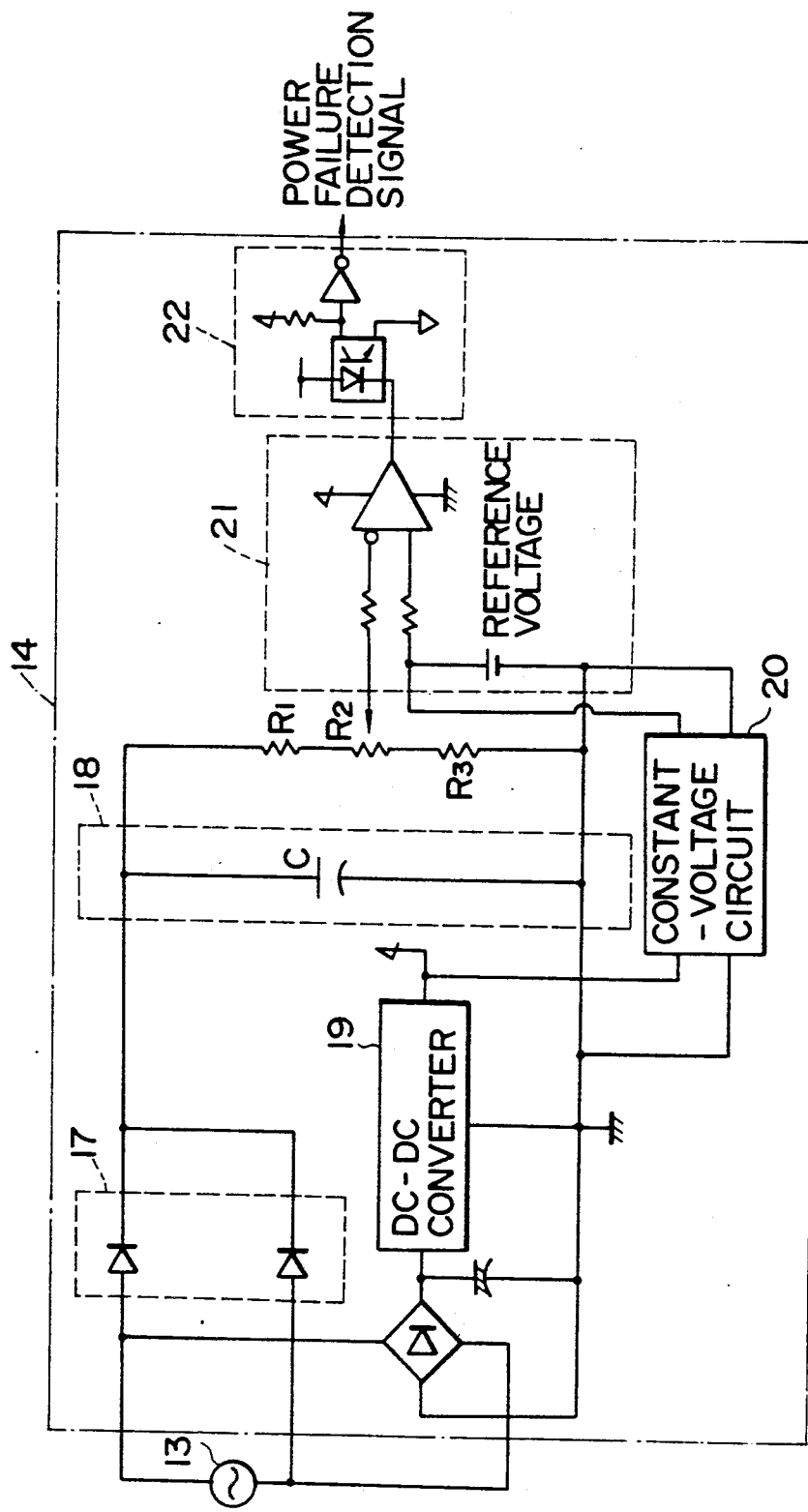
FIG. 2 is a circuit diagram of the power failure detecting circuit shown in FIG. 1.

Referring to FIG. 2, the power failure detecting circuit 14 includes a rectifying circuit 17, smoothing circuit 18, DC-DC converter 19, constant-voltage circuit 20, determining circuit 21 and transmitting circuit 22. A voltage from the AC power supply 13 for the detection of the power failure is rectified by the rectifying circuit 17, and is then smoothed by the smoothing circuit 18. A level of an output voltage from the smoothing circuit 18 is monitored in the determining circuit 21. A voltage between the DC-DC converter 19 and the determining circuit 21 is input to the constant-voltage circuit 20 such as a Zener diode, and an output voltage from the constant-voltage circuit 20, is set as a reference voltage. If the voltage level being monitored becomes lower than the reference voltage, the determining circuit 21 determines that the power failure is generated, and the transmitting circuit 22 outputs a power failure detection signal to a CPU (including the memories 15a and 15b and the determiner 16). A period of time ($t_1$ in FIGS. 3 and 6) from the generation of the power failure to the detection of the power failure is controlled by a capacitor C and resistors $R_1$ to $R_3$ in the power failure detecting circuit 14.

There will now be described the method of the first preferred embodiment of the present invention to be embodied by the device as described above.

Figure 3:
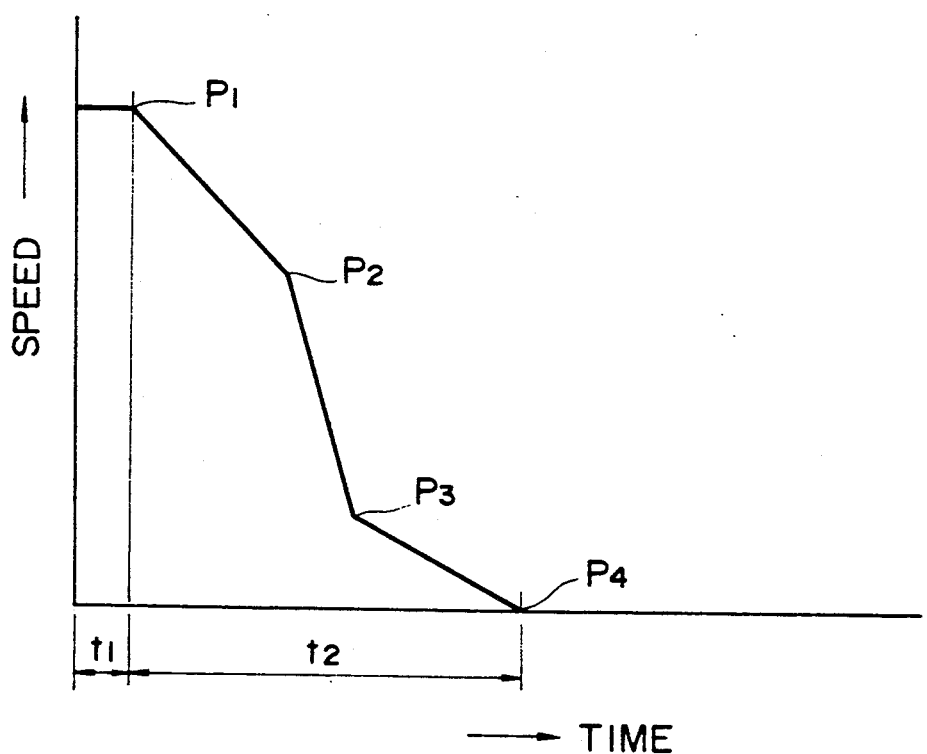
FIGS. 3 to 5 are graphs illustrating the operation of the first preferred embodiment of the present invention.

In the case that the AC power supply 13 suddenly fails to operate during operation of the industrial robot, the motion of the robot can be shown as a speed change in FIG. 3. Upon initiation of the power failure, a period of time $t_1$ (e.g., about 10 msec) elapses until the power failure detecting circuit 14 detects the power failure. At the same time of detection of the power failure, a stop command is input to a servo driver in a servo fashion (point $P_1$) to thereby gradually reduce a speed of the robot. Then, a motor brake is operated (point $P_2$; e.g., 50 msec after the generation of the power failure). Thereafter, a supply voltage of the servo driver is reduced, and a stop ability thereof becomes null (point $P_3$). From this timing, the operation of the motor brake only is applied to the robot, and the robot is finally stopped (point $P_4$). A period of time $t_2$ from the detection of the power failure to the stoppage of the robot is about 200 msec.

Figure 4:
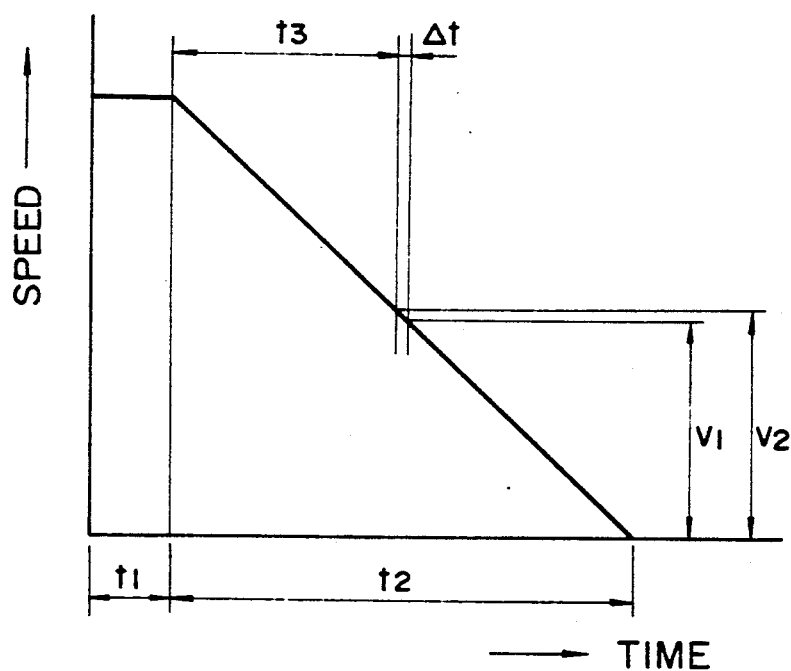

The graph of FIG. 3 may be simplified as shown in FIG. 4. At a time $t_3$ and a time $t_3 + \Delta t$ from the detection of the power failure by the power failure detecting circuit 14, two position data of the motor 3 (two count values of the updown counter 8) are stored into the memories 15a and 15b. If the time interval $\Delta t$ is short, a speed $v_1$ at the time $t_3$ is almost equal to a speed $v_2$ at the time $(t_3 + \Delta t)$ (i.e., $v_1 \approx v_2$). Further, when the difference between the position data (count values) stored in the memories 15a and 15b is divided by the time interval $\Delta t$, it will become a speed, and it is accordingly proportional to a rotational speed of the motor 3 in the time $\Delta t$.

Figure 5:
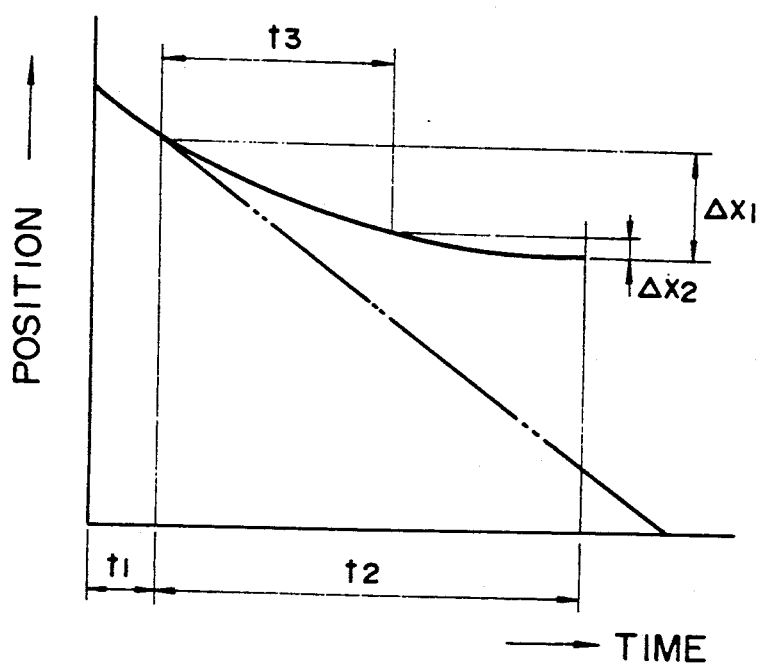

The graph of FIG. 4 showing the motion of the robot as a speed change may be converted to a graph of FIG. 5 showing a position change of the robot. As apparent from FIG. 5, the position change is drawn as a quadratic curve. An inertial moving distance $\Delta x_1$ of the robot from the detection of the power failure to the stoppage of the robot is substantially proportional to a square of the speed at the time of detection of the power failure. Further, the time $t_2$ from the detection of the power failure to the stoppage of the robot is substantially proportional to the speed at the time of detection of the power failure. Similarly, an inertial moving distance $\Delta x_2$ of the robot from the time $t_3$, when storage of the position data into the memories 15a and 15b is started to the stoppage of the robot, is substantially proportional to a square of the speed of the time $t_3$.

The permissible value to be preliminarily set in the determiner 16 will now be concretely described by citing a numerical example. Assuming that a maximum rotational speed $N_{max}$ of the motor 3 of the robot is 50 revolutions/sec; $t_2 = 200$ msec ($= 0.2$ sec), $t_3 = 0$, $\Delta t = 20$ msec ($= 0.02$ sec) are set; a reduction in speed due to $\Delta t$ is ignorable; and the power failure is detected under the condition of the maximum rotational speed $N_{max}$, a difference between rotational angles (position data) of the motor 3 to be stored in the memories 15a and 15b is obtained as follows:

$$N_{max} \times \Delta t = 50 \times 0.02 = 1 \text{ revolution.}$$

Further, the number of revolution of the motor 3 from the detection of the power failure to the stoppage of the motor 3 is obtained as follows:

$$(\tfrac{1}{2}) \times N_{max} \times t_2 = (\tfrac{1}{2}) \times 50 \times 0.2$$
$$= 5 \text{ revolutions,}$$

In the rotational angle detecting device as shown in FIG. 1 similar to FIG. 11, as far as the rotational angle of the motor 3 upon power cut-off or power failure is not greater than $\pm 180°$ ($\tfrac{1}{2}$ revolution), the origin return operation is not required at the time of resupplying power. However, when the number of revolutions of the motor 3 is 5, which is greater than $\tfrac{1}{2}$ as in the above case, the origin return operation is required after solution of the power failure. Accordingly, when the difference between the rotational angles (position data) of the motor 3 to be stored into the memories 15a and 15b is 1, as in the above case, the origin return operation is required after solution of the power failure. Conversely, when the number of revolution of the motor 3 from the detection of the power failure to the stoppage of the motor 3 is $\tfrac{1}{2}$, a permissible rotational speed v of the motor at the time of detection of the power failure is obtained as follows:

$$(\tfrac{1}{2}) \times v \times [(v/N_{max}) \times t_2] = \tfrac{1}{2}$$

$$v \times [(v/50) \times 0.2] = 1 \therefore v \approx 15.8 \text{ revolutions/sec}$$

Accordingly, when a rotational speed of the motor 3 at the time of storage of the position data into the memories 15a and 15b is equal to or less than 15.8 revolutions/sec, the motor 3 is stopped in a position range where the origin return operation is not required after solution of the power failure. In this case, a difference between the position data stored in the memories 15a and 15b becomes as follows:

$$15.8 \times 0.02 \simeq 0.32 \text{ revolutions}$$

Accordingly, when the difference is equal to or less than 0.32, the motor 3 is stopped in the position range where the origin return operation is not required after solution of the power failure. Consequently, the permissible value to be preliminarily set in the determiner 16 in this numerical example is a count value corresponding to 0.32 revolutions.

Although $t_3=0$ is set in the above numerical example, $t_3$ may be set to a larger value, thereby increasing the permissible rotational speed to result in an advantage for determination. Further, since the period of time $t_2$ from the detection of the power failure to the stoppage of the motor depends on a load inertia and a motor capacity, it is preferable to decide the period of time $t_2$ for every axis of rotation of the robot.

As mentioned in the above numerical example, the permissible value is suitably preset in the determiner 16, and when the power failure in the AC power supply 13 is detected by the power failure detecting circuit 14, two position data (rotational angles of the motor 3; count values) detected by the updown counter 8 are stored into the memories 15a and 15b at the time interval $\Delta t$ after an appropriate time ($t_3$) has elapsed from the timing of detection of the power failure.

Thereafter, upon solution of the power failure, a difference between the two position data stored in the memories 15a and 15b is calculated in the determiner 16, and this difference is compared with the present permissible value to determine whether or not the origin return operation is required.

In the preferred embodiment, if the difference between the two position data is greater than the permissible value, the determiner 16 determines that the rotational speed of the motor 3 at the time of storage of the position data is high, and that the motor 3 cannot be stopped in a permissible position range (within $\pm 180°$) where the origin return operation is not required, thus requiring the origin return operation after solution of the power failure.

On the other hand, if the difference between the two position data is equal to or greater than the permissible value, the determiner 16 determines that the rotational speed of the motor 3 is low, and that the motor 3 can be stopped in the permissible position range (within $\pm 180°$) where the origin return operation is not required. Accordingly, as mentioned with reference to FIG. 11, an absolute rotational angle of the motor 3 is detected by the functions of the memories 9 and 10, the comparator 11 and the corrector 12. Thus, the determiner 16 determines that the origin return operation after solution of the power failure is not required.

As described above, according to the method of the first preferred embodiment of the present invention, in the case of generation of the power failure (power cutoff) during the operation of the robot, the determination whether or not the original return operation after solution of the power failure (upon resupplying of power) is required can be carried out by a simple construction or occasionally by a software processing only without adding any additional hardware. Therefore, an applicable range of the origin return operation elimination technique can be greatly expanded, and the reliability of the rotational angle detecting device, as shown in FIGS. 1 and 11, can be increased.

Although two position data are detected and stored into the memories 15a and 15b in the first preferred embodiment, three or more position data may be detected and stored by adding memories. With this configuration, a difference between each position data may be compared with a permissible value to determined whether or not the origin return operation is required. Further, the determination may be carried out by calculation from a quadratic expression. In this case, the reliability of the determination can be greatly increased.

Next, there will be described the method of the second preferred embodiment of the present invention to be embodied by the device as shown in FIG. 1.

In the case that the AC power supply 13 suddenly fails to operate during the operation of the industrial robot, the motion of the robot is the same as described with reference to FIGS. 3 to 5, and it is shown as a quadratic curve in FIG. 6. Also in FIG. 6, $t_1$ denotes a period of time from the generation of the power failure to the detection of the power failure by the power failure detecting circuit 14, and $t_2$ denotes a period of time from the detection of the power failure to the stoppage of the robot.

Figure 7:
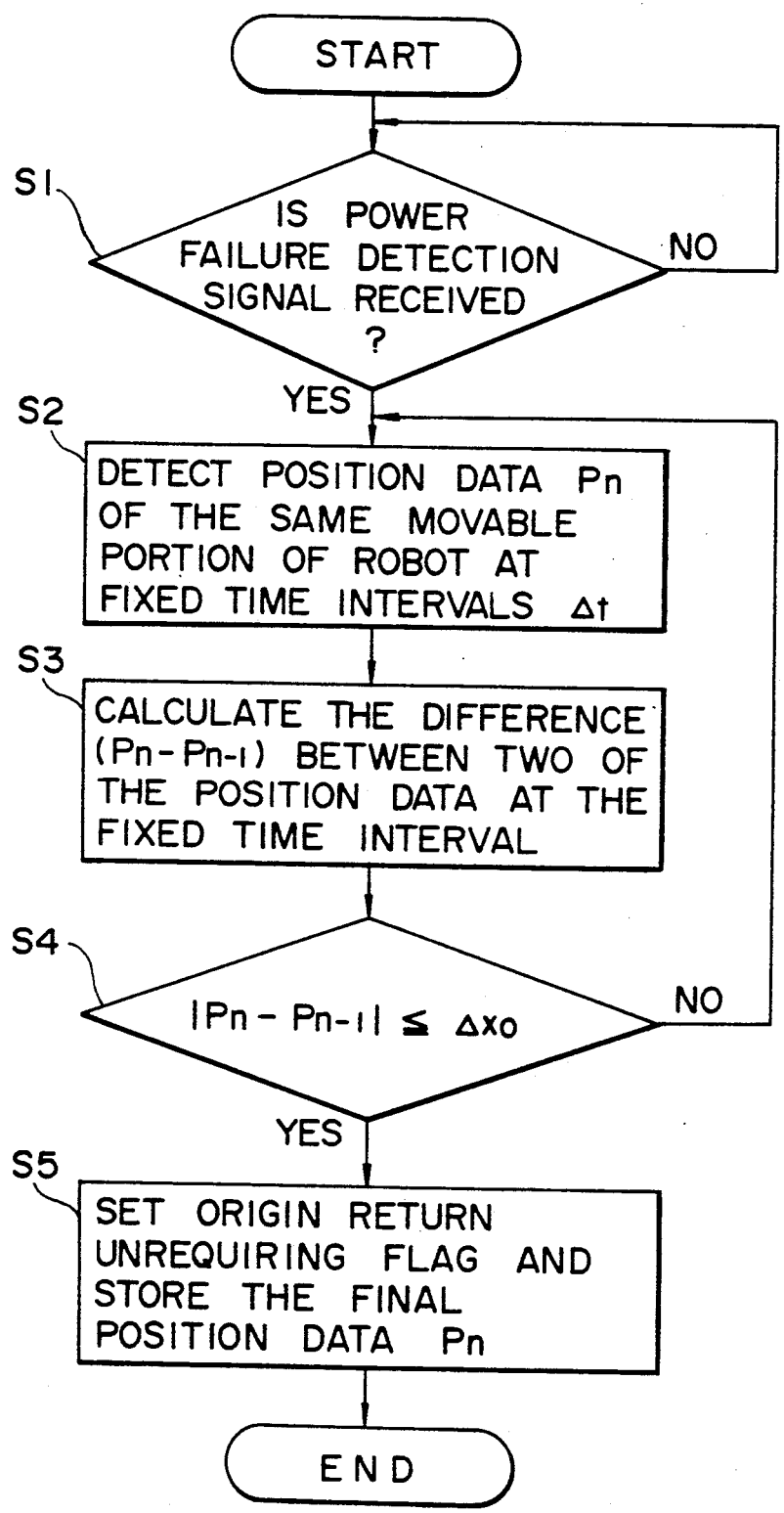
FIGS. 7 and 8 are flowcharts of the operation of the second preferred embodiment.

In the second preferred embodiment, the determiner 16 determines whether or not the origin return operation is required according to a flowchart as shown in FIG. 7. Referring to FIG. 7, a suitable permissible value $\Delta x_0$ is preliminarily set in the determiner 16. When the power failure in the AC power supply 13 is detected by the power failure detecting circuit 14 (step S1), position data (rotational angles of the motor 3; count values) $P_n$ are detected by the updown counter 8 at fixed time intervals $\Delta t$ from the timing of the detection of the power failure (step S2), and these detected values are stored alternately into the memories 15a and 15b.

Then, a difference ($P_n - P_{n-1}$), between two of the position data at the fixed time interval $\Delta t$ output from the memories 15a and 15b is calculated in the determiner 16 (step S3). At this time, if the time interval $\Delta t$ is short, the speeds $v_1$ and $v_2$ of the robot (motor 3) at the fixed time interval $\Delta t$ after the detection of the power failure are almost equal to each other (i.e., $v_1 \simeq v_2$), and the difference ($P_n - P_{n-1}$) between the position data (count values) stored in the memories 15a and 15b is proportional to the rotational speed of the motor 3 since the division of the difference by the fixed time interval $\Delta t$ results in the speed.

An absolute value of the difference ($P_n - P_{n-1}$) between the position data obtained above is compared with the predetermined permissible value $\Delta x_0$ (step S4). If the absolute value $|P_n - P_{n-1}|$ is equal to or less than $\Delta x_0$, it is determined that the speed of the motor 3 is low, and that the motor 3 can be stopped in the range (within $\pm 180°$) where the origin return operation is not required, with the result that the origin return operation after solution of the power failure is not required. Accordingly, an origin return unrequiring flag is set, and the final position data $P_n$ is stored (step S5). The origin return unrequiring flag is stored into a non-volatile memory (not shown) (e.g., when the flag is up, it is stored as "1", while when it is down, it is stored as "0").

Figure 8:
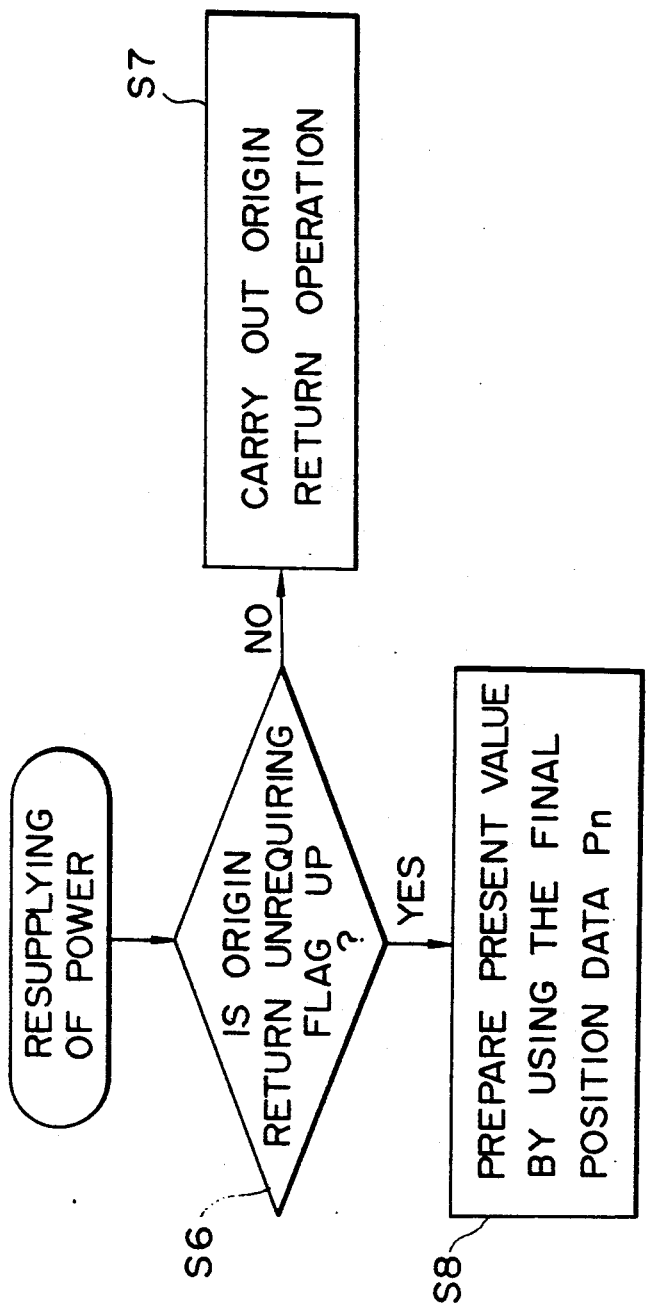

In the second preferred embodiment, the calculation of the difference ($P_n - P_{n-1}$) between the position data is repeated until the difference ($P_n - P_{n-1}$) becomes equal to or less than the predetermined permissible value $\Delta x_0$. For instance, if $|P_4-P_3|>\Delta x_0$ and $|P_5-P_4|\leq \Delta x_0$, the detection of the position data $P_n$ until $P_5$ is executed, and the subsequent operation is not carried out. In step S4, if the condition of $|P_n-P_{n-1}|\leq \Delta x_0$ is not satisfied, and the supply voltage is lowered to cause an inoperative condition of the CPU (determiner 16), the origin return unrequiring flag is down. Accordingly, upon resupplying of power as shown in FIG. 8, it is determined whether or not the origin return unrequiring flag is up (i.e., whether it is "1") (step S6). If the flag is down, the origin return operation is carried out (step S7), while if the flag is up, a present value (absolute rotational angle of the motor 3) is prepared in accordance with the same procedure as the prior art by using the final position data $P_n$ (step S8). In preparing the present value by using the final position data $P_n$, if it is determined that the origin return operation is required, the origin return operation is executed.

As described above, also according to the method of the second preferred embodiment of the present invention, when the power failure (power cut-off) is generated during the operation of the robot, the determination as to whether or not the origin return operation is required after solution of the power failure (upon resupplying of power) can be executed reliably and precisely even in a very unstable state after the power failure. Thus, the second preferred embodiment can exhibit the same effect as that of the first preferred embodiment.

Although the detection and the determination are stopped just after the condition of $|P_n-P_{n-1}|\leq \Delta x_0$ is satisfied according to the second preferred embodiment, the detection of the position data may be continued while the CPU is in an operative condition in spite of the fact that the above condition has been satisfied. In this case, a substantial final position data $P_m$ to be detected just before stoppage of the operation of the CPU is stored, and the present value upon resupplying of the power is prepared by using the position data $P_m$.

Further, although the determination as to whether or not the origin return operation is required is executed for one axis of the motor 3 of the robot in the first and second preferred embodiments, such determination is executed for every axis in an actual multi-axis robot, and when it is determined that the origin return operation is required for even one of the plural axes, the origin return operation is carried out. Further, the determiner 16 as mentioned in the first and second preferred embodiments may be installed in the CPU for controlling the robot.

Further, although the power cut-off condition during the operation of the robot is caused by the power failure in the AC power supply 13 in the first and second preferred embodiments, any other causes of such power cut-off condition may be considered such as power cut-off by operation of an emergency stop button and emergency stop due to heavy abnormality. Also upon resupplying of power after such emergency stop, the determination as to whether or not the origin return operation is required is executed in the same manner as the above.

Figure 9:
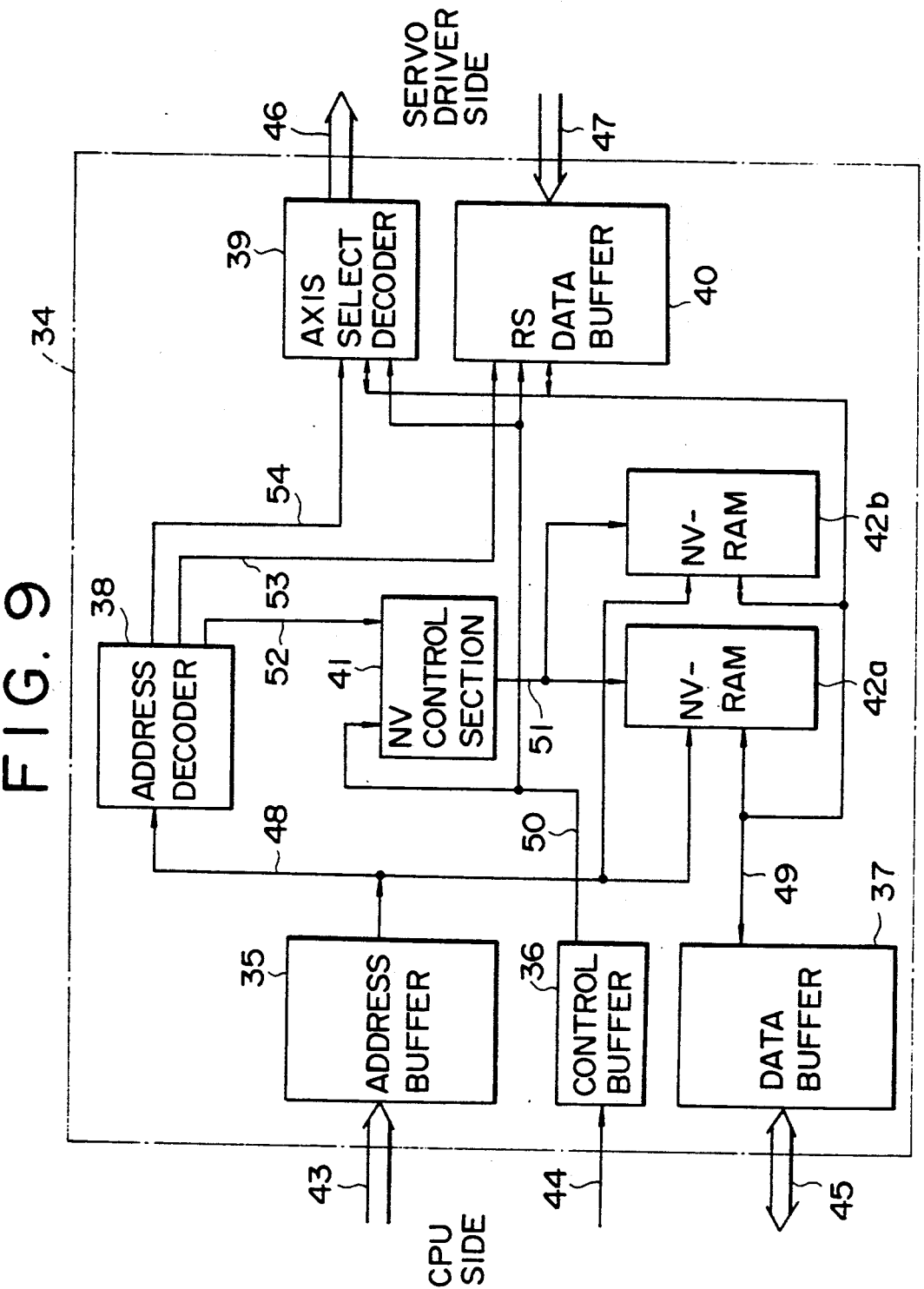
FIG. 9 is a block diagram of an exemplary origin return elimination interface section in the device according to the present invention.
Figure 10:
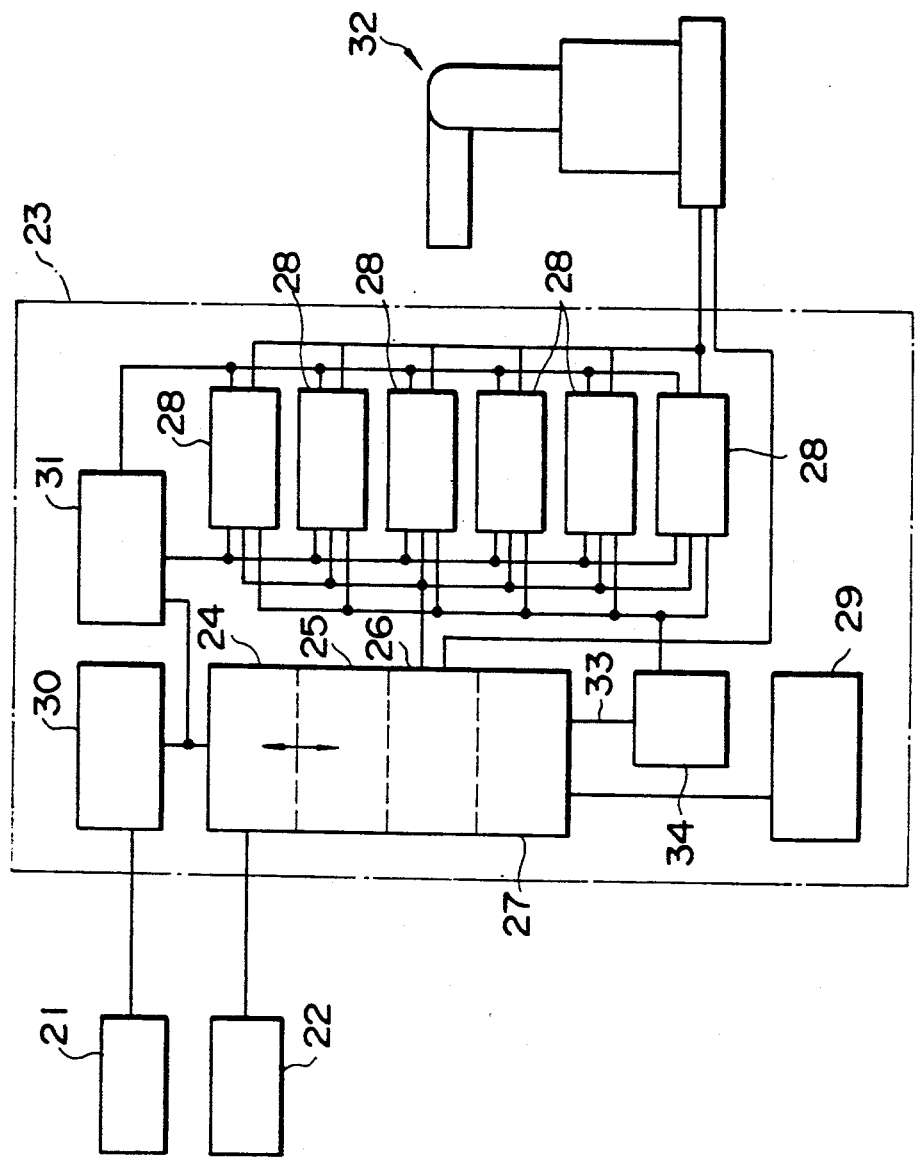
FIG. 10 is a block diagram of the robot and its control system employing the interface section shown in FIG. 9.

The methods of the first and second preferred embodiments according to the present invention are embodied by the device as shown in FIG. 1. Alternatively, the method of the present invention may be embodied by a device as shown in FIGS. 9 and 10.

First, the construction of the robot and its control system to which the device of the present invention is applied will be described with reference to FIG. 10. Referring to FIG. 10, reference numeral 21 designates an operation panel for switching on and off a control power supply 30 and starting the mode, and reference numeral 22 designates a teach pendant (portable unit) connected to a control system 23 for giving a predetermined program to an industrial robot 32 or operating the robot 32. The control system 23 includes a CPU 24, memory 25, servo control circuit 26, machine interface section 27, servo drivers 28 and I/O section 29.

The CPU 24 calculates and executes a control program and a task program, and it functions as a control section for controlling the industrial robot 32 in receipt of absolute rotational angle data from a resolver (absolute rotational angle detecting means) (not shown) through a generalized bus line 33. The memory 25 stores the control program, the task program, etc. The servo control circuit 26 is a circuit for carrying out position/speed command and position count to the servo drivers 28. The machine interface section 27 functions as an interface to an operation limit switch and an origin position limit switch, and the CPU 24 controls the servo control circuit 26 according to a signal from the interface section 27. The servo drivers 28 respectively control the operation of motors (cf. motor 3 shown in FIG. 1) for driving axes of the robot 32 (e.g., six axes are provided and six servo drivers 28 are accordingly provided in the case of FIG. 10). The I/O section 29 functions as an interface for carrying out inputting and outputting with respect to an external section. Reference numeral 31 designates a servo power supply for driving the motors.

Each axis of the industrial robot 32 is provided with a resolver (cf. reference numeral 4 in FIG. 1) for detecting an absolute rotational angle within one revolution of the motor for driving each axis, and also with a resolver/digital (R/D) converter (cf. reference numeral 6 in FIG. 1) for converting a detected data of each resolver to a digital signal. The CPU 24 side (the machine interface section 27) is connected through the generalized bus line 33 to the resolver side (the servo drivers 28), and the generalized bus line 33 is provided with an origin return unrequiring interface section 34 constituting a characterized part of the device according to the present invention.

The origin return elimination interface section 34 includes a non-volatile memory means (NV-RAM to be hereinafter described) for storing absolute rotational angle data from the resolvers upon power cut-off of the industrial robot 32. The detailed construction of the origin return elimination interface section 34 is shown in FIG. 9.

Referring to FIG. 9, reference numeral 35 designates an address buffer which receives an address output from the CPU 24 through an address bus 43 of the generalized bus line 33; 36 designates a control buffer which receives a control timing signal from the CPU 24 through a control bus 44 of the generalized bus line 33; 37 designates a data buffer which inputs and outputs data from/to the CPU 24 through a data bus 45 of the generalized bus line 33; 38 designates an address decoder which receives an output from the address buffer 35 through an internal address bus 48 and defines chip select; 39 designates an axis select decoder which outputs to a bus line 46 an axis select signal relating to what of the plural axes of the industrial robot 32 is to be selected. More specifically, when the axis select decoder 39 receives a chip select signal from the address decoder 38 through a chip select line 54, the decoder 39 is operated by a timing signal from the control buffer 36 through an internal control bus 50, and outputs the axis select signal according to data fed from the data buffer 37 through an internal data bus 49.

Reference numeral 40 designates an RS data buffer which receives absolute rotational angle data (digital signal) within one revolution of the motor from the resolver (R/D converter) provided for every axis through a data bus line 47. More specifically, when the RS data buffer 40 receives a chip select signal from the address decoder 38 through a chip select line 53, the buffer 40 is operated by the timing signal from the control buffer 36 through the internal control bus 50, and outputs the absolute rotational angle data through the internal data bus 49.

Reference numeral 41 designates an NV control section for controlling NV (Non Voltage)-RAMs 42a and 42b through an NV control bus 51. More specifically, when the NV control section 41 receives a chip select signal from the address decoder 38 through a chip select line 52, the NV control section 41 is operated by the timing signal from the control buffer 36 through the internal control bus 50, and controls to write or read the data (the absolute rotational angle data from the RS data buffer 40) to/from addresses in the NV-RAMs 42a and 42b according to an output from the address buffer 35 through the internal address bus 48.

Each of the NV-RAMs 42a and 42b is comprised of S(Static)-RAM and EEPROM, and each is designed in such a manner that data on the S-RAM are simultaneously transferred and stored into the EEPROM by a store instruction. Alternatively, data stored in the EEPROM are simultaneously returned to the S-RAM by a recall instruction. The NV-RAMs 42a and 42b are nonvolatile memories which do not require battery backup at all. Although two NV-RAMs are provided in order to ensure a memory capacity in this preferred embodiment, a single NV-RAM may be provided.

The origin return elimination interface section 34 is formed on a single printed circuit board, for example, and this printed circuit board is provided in the generalized bus line 33, thus realizing the device of the present invention.

With the construction as mentioned above, when the power is cut off, the absolute rotational angle data of all the motors corresponding to the six axes of the industrial robot 32 are stored into the NV-RAMs 42a and 42b of the interface section 34 in the following manner. For better understanding, the following description will be directed to the operation of storage of the absolute rotational angle data of one of the motor corresponding to one axis and the operation of determination whether or not the origin return operation is required per axis.

When the power is cut off, the CPU 24 outputs to each servo driver 28 a command for fetching an absolute rotational data per axis, so as to store the absolute rotational angle data (digital signal) within one revolution of each motor. At this time, an address output and a data output from the CPU 24 are fed through the address bus 43 to the address buffer 35 and through the data bus 45 to the data buffer 37, respectively. Then, the address decoder 38 defines chip select of the axis select decoder 39 according to the address output from the address buffer 35, and the axis select decoder 39 then outputs to the bus line 46 an axis select signal for selecting an axis to be determined according to the data output from the data buffer 37.

If the power cut-off condition has been generated during the operation of the robot, the CPU 24 sequentially outputs the command for fetching the absolute rotational angle data in accordance with the timing as shown in FIGS. 5 and 6.

Thus, the absolute rotational angle data of the axis corresponding to the axis select signal is input from the corresponding resolver through the data bus line 47 to the RS data buffer 40.

Then, the CPU 24 generates a command for transferring the absolute rotational angle data in the RS data buffer 40 to the CPU 24. Accordingly, the address decoder 38 defines chip select of the RS data buffer 40, and the absolute rotational angle data stored in the RS data buffer 40 is transferred through the internal data bus 49, the data buffer 47 and the data bus 45 to the CPU 24.

Then, the absolute rotational angle data transferred to the CPU 24 is transferred to the NV-RAM 42a (or 42b) and stored therein. More specifically, the address decoder 38 defines chip select of the NV control section 41 according to an address output from the CPU 24, and an address in the NV-RAM 42a where the data is to be stored is also defined according to the address output. Then, the absolute rotational angle data is stored through the data bus 45, the data buffer 37 and the internal data bus 49 into the NV-RAM 42a, and is written at the determined address on the S-RAM in the NV-RAM 42a.

The above operation is conducted for every axis of the industrial robot 32, and the absolute rotational angle data of all the axes are stored into the S-RAM in the NV-RAM 42a (or 42b). Then, according to a store instruction from the CPU 24 through the NV control section 41, the absolute rotational angle data of all the axes are transferred to the EEPROM.

Accordingly, even under the power cut-off condition, the absolute rotational angle data of all the axes are retained with a high reliability.

On the other hand, when power is supplied again, all the absolute rotational angle data stored in the EEPROM upon power cut-off are simultaneously returned to the S-RAM in the NV-RAM 42a (or 42b) according to a recall instruction from the CPU 24 through the NV control section 41.

Then, in order to determine whether or not the origin return operation is required in a determining means in the CPU 24, the CPU 24 fetches absolute rotational angle data of every axis within one revolution of each motor of the robot 32 upon resupplying of the power in the same manner as described above. At the same time, the CPU 24 reads out the absolute rotational angle data upon power cut-off from the S-RAM in the NV-RAM 42a and transfers the same through the internal data bus 49, the data buffer 37 and the data bus 45 to a work area in the memory 25.

Thereafter, the determining means in the CPU 24 determines whether or not the origin return operation is required in accordance with the procedure as mentioned in the first preferred embodiment or the second preferred embodiment.

As described above, according to the device of this preferred embodiment, the absolute rotational angle data upon power cut-off are stored at a suitable timing into the NV-RAM 42a (or 42b) in the interface section 34 provided in the generalized bus line 33. Then, upon resupplying of power, the data stored in the NV-RAM 42a (or 42b) are read out through the generalized bus line 33 to the CPU 24, and a determination is made by the determining means in the CPU 24 as to whether or not the origin return operation is required according to the absolute rotational angle data. Accordingly, it is not necessary to provide a special detector and a special wiring for the non-volatile memory. Thus, the determination as to whether or not the origin return operation is required can be conducted with a very simple construction. Further, as this preferred embodiment employs the NV-RAMs 42a and 42b as the non-volatile memory means, it is advantageous that the absolute rotational angle data can be retained with a high reliability without battery backup.

Although this preferred embodiment is applied to the industrial robot 32 having six axes, the number of axis of the robot 32 is not limited according to the present invention. Further, although this preferred embodiment employs the NV-RAMs 42a and 42b as the non-volatile memory means, any non-volatile memory such as a battery backup RAM other than the NV-RAM may be employed according to the present invention.

What is claimed is:

1. A method of determining whether or not an origin return operation for an industrial robot is required, comprising the steps of:
   (a) detecting at least two position data of the same movable portion of said industrial robot at a predetermined time interval after power cut-off during operation of said industrial robot;
   (b) comparing said at least two position data detected with each other and obtaining a difference therebetween;
   (c) comparing said difference with a permissible value corresponding to said difference; and
   (d) determining that the origin return operation is required upon resupplying of power if said difference is greater than said permissible value, while determining that the origin return operation is not required upon resupplying of power if said difference is equal to or less than said permissible value.

2. A method of determining whether or not an origin return operation for an industrial robot is required, comprising the steps of:
   (a) detecting a plurality of position data of the same movable portion of said industrial robot at fixed time intervals after power cut-off during operation of said industrial robot;
   (b) obtaining a difference between two of said position data detected at the fixed time interval sequentially until said difference becomes equal to or less than a predetermined permissible value; and
   (c) determining that the origin return operation is not required upon resupplying of power only when said difference is equal to or less than said predetermined permissible value.

* * * * *